United States Patent
Lucas et al.

(10) Patent No.: US 7,696,863 B2
(45) Date of Patent: Apr. 13, 2010

(54) METHOD AND DEVICE FOR WARNING THE DRIVER OF A MOTOR VEHICLE

(75) Inventors: Bernhard Lucas, Besigheim (DE);
Martin Heinebrodt, Stuttgart (DE);
Dirk Meister, Moeglingen (DE); Ulrike Ahlrichs, Korntal-Muenchingen (DE);
Ulf Wilhelm, Rutesheim (DE); Paco Haffmans, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 10/579,998

(22) PCT Filed: Jul. 22, 2004

(86) PCT No.: PCT/DE2004/001623

§ 371 (c)(1),
(2), (4) Date: May 19, 2006

(87) PCT Pub. No.: WO2005/055171

PCT Pub. Date: Jun. 12, 2005

(65) Prior Publication Data

US 2007/0075850 A1    Apr. 5, 2007

(30) Foreign Application Priority Data

Nov. 28, 2003 (DE) ............................ 103 56 307

(51) Int. Cl.
*B60Q 1/00* (2006.01)
(52) U.S. Cl. .................. 340/435; 340/438; 701/300; 701/301
(58) Field of Classification Search .............. 340/435, 340/436, 438, 439, 441; 701/45, 300, 301
See application file for complete search history.

(56) References Cited

U.S. PATENT DOCUMENTS

| | | | | |
|---|---|---|---|---|
| 5,173,859 A | * | 12/1992 | Deering | 701/70 |
| 5,357,438 A | | 10/1994 | Davidian | |
| 5,375,060 A | * | 12/1994 | Nocker | 701/301 |
| 5,410,304 A | * | 4/1995 | Hahn et al. | 340/903 |
| 5,432,509 A | * | 7/1995 | Kajiwara | 340/903 |
| 5,473,538 A | * | 12/1995 | Fujita et al. | 701/45 |
| 5,572,428 A | * | 11/1996 | Ishida et al. | 701/301 |
| 5,594,412 A | * | 1/1997 | Matsumoto | 340/435 |
| 5,680,118 A | * | 10/1997 | Cusumano et al. | 340/903 |
| 5,684,473 A | * | 11/1997 | Hibino et al. | 340/903 |
| 6,150,932 A | * | 11/2000 | Kenue | 340/435 |
| 6,311,123 B1 | * | 10/2001 | Nakamura et al. | 340/435 |

(Continued)

FOREIGN PATENT DOCUMENTS

DE    198 57 992    6/2000

(Continued)

*Primary Examiner*—Eric M Blount
(74) *Attorney, Agent, or Firm*—Kenyon & Kenyon LLP

(57) ABSTRACT

A method and a device for warning the driver of a motor vehicle. An object detector is provided, which detects preceding vehicles and ascertains their distance and relative velocity with respect to the host vehicle and supplies these to an evaluation device. The evaluation device assumes that the preceding vehicle would perform a deceleration and ascertains as a further function of the variables measured by the object detector and the driver's reaction time and the host vehicle's maximum possible deceleration whether a collision with the preceding vehicle would be avoidable. If an unavoidability of a collision is recognized, then a driver warning device is activated.

22 Claims, 2 Drawing Sheets

U.S. PATENT DOCUMENTS

| | | | |
|---|---|---|---|
| 6,510,932 B2 * | 1/2003 | Ikeda et al. | 192/54.4 |
| 6,679,702 B1 * | 1/2004 | Rau | 340/435 |
| 6,803,673 B2 * | 10/2004 | Otterbach et al. | 701/45 |
| 6,871,145 B2 * | 3/2005 | Altan et al. | 340/436 |
| 6,940,448 B2 * | 9/2005 | Knoop et al. | 340/436 |
| 7,002,452 B2 * | 2/2006 | Watanabe et al. | 340/436 |
| 7,095,336 B2 * | 8/2006 | Rodgers et al. | 340/903 |
| 7,124,027 B1 * | 10/2006 | Ernst et al. | 340/436 |
| 7,206,697 B2 * | 4/2007 | Olney et al. | 701/301 |
| 2003/0191568 A1 * | 10/2003 | Breed | 340/438 |

FOREIGN PATENT DOCUMENTS

| | | |
|---|---|---|
| EP | 0 348 691 | 1/1990 |
| EP | 0 443 644 | 8/1991 |
| EP | 0 549 909 | 8/1996 |
| FR | 2 427 656 | 12/1979 |
| JP | 7-141600 | 6/1995 |
| JP | 7-296298 | 11/1995 |
| JP | 9-505781 | 6/1997 |
| JP | 10-181487 | 7/1998 |
| JP | 10-338111 | 12/1998 |
| JP | 11-222113 | 8/1999 |
| JP | 2002-302026 | 10/2002 |
| JP | 2007-516520 | 6/2007 |
| WO | WO 93/24894 | 12/1993 |
| WO | WO 2005/055171 | 7/2004 |

* cited by examiner

METHOD AND DEVICE FOR WARNING THE DRIVER OF A MOTOR VEHICLE

FIELD OF THE INVENTION

The present invention relates to a method and a device for warning the driver of a motor vehicle. An object detector is provided, which detects preceding vehicles and ascertains their distance and relative velocity with respect to the host vehicle and supplies these to an evaluation device. The evaluation device assumes that the preceding vehicle would perform a deceleration and ascertains as a further function of the variables measured by the object detector and the driver's reaction time and the host vehicle's maximum possible deceleration whether a collision with the preceding vehicle would be avoidable. If an unavoidability of a collision is recognized, then a driver warning device is activated.

BACKGROUND INFORMATION

A haptic indicator for motor vehicles is described in European Patent No. EP 0 348 691 A2, which in combination with a proximity-warning device gives the driver an appropriate signal when a minimum distance with respect to the preceding vehicle is undershot. Vibrations of the vehicle or its parts such as the steering wheel or the driver's seat are provided as a haptic signal. The vibrations are caused for example by an intermittent interruption of the ignition of the engine.

German Patent Application No. DE 198 57 992 shows a device for kinesthetically signaling the driver of a motor vehicle if in a system for controlling the travel velocity a shutdown is imminent or has occurred, caused by a malfunction or intentionally, or if in a system for controlling the travel velocity a set maximum value of the deceleration is not sufficient to avoid a collision of the controlled vehicle with a preceding vehicle or an obstacle, means being available, which modulate a brake setpoint value or a variable derived from it in such a way that the motor vehicle under goes a deceleration fluctuating over time that is noticeable by the driver.

SUMMARY

In accordance with an example embodiment of the present invention, a method and a device are provided for warning the driver of a motor vehicle, informing the driver as to whether, if the preceding vehicle were suddenly to brake with a certain deceleration value, a collision of the host vehicle with the preceding vehicle would be avoidable or not. An example method according to the present invention and an example device according to the present invention accordingly informs the driver as to whether in the current driving situation, depending on the distance, the relative velocity of the two vehicles, the host vehicle's absolute velocity as well the host vehicle's ability to decelerate and reaction time, a collision would be avoidable or a collision would not be avoidable in the event of a sudden deceleration of the preceding vehicle.

Advantageously, the reaction time of the driver may be determined by averaging reaction times from previous driving situations in which a driver reaction was required.

It is furthermore advantageous if the reaction time of the driver is a predetermined, fixed value.

It is furthermore advantageous if the driver of the vehicle is personally able to specify the reaction time with the aid of a control element.

Advantageously, the driver warning is issued by an acoustic and/or visual signal.

Advantageously, the driver warning is issued by reversible belt tensioners in that these are pretensioned once or several times.

Furthermore it is advantageous that the driver warning is issued by a brief triggering of the deceleration device.

Furthermore it is advantageous if the driver warning is issued by a haptic accelerator pedal. To this end there may be a provision for example to cause the accelerator pedal to vibrate with the aid of a vibration device or for the accelerator pedal to build up a restoring force against the pedal pressure of the driver's foot in accordance with a specified setpoint value.

Furthermore it is advantageous that the driver warning is issued in the form of a vibration of the steering wheel. This may occur with the aid of a vibration device attached to the vehicle's steering wheel, which when activated puts the steering wheel into a vibratory motion and thereby communicates a warning to the driver.

Advantageously, a visual and/or acoustic signaling device is provided as a driver warning device. For this purpose, the visual signaling device may be mounted in a display of the dashboard for example as a control lamp or as a plain text display. Furthermore it is possible to project the visual signaling devices with the aid of a head-up display into the driver's field of vision. It is furthermore possible for the acoustic signaling device to be a warning sound or a textual output, which indicates the concrete reason for the warning by a voice output.

Furthermore it is advantageous to provide a reversible belt tensioner as a driver warning device. This reversible belt tensioner may be for example an electromotively operated belt tensioner, which may repeatedly perform a tensioning of the belt, releasing the belt tension again at each turn.

In a particularly advantageous manner, the vehicle deceleration devices may be provided as a driver warning device.

The example method according to the present invention may be implemented in the form of a control element provided for a control unit of a collision warning device of a motor vehicle. For this purpose, a program that is executable on a computer, in particular on a microprocessor or signal processor, and is suitable for implementing the method according to the present invention, is stored in the control element. In this case, the present invention is thus implemented by a program stored in the control element such that this control element provided with the program represents the present invention in the same manner as the method which the program is suited to implement. In particular, an electrical storage medium, for example a read-only memory, may be used as a control element.

Additional features, applications and advantages of the present invention are derived from the following description of exemplary embodiments of the present invention, which are illustrated in the figures of the drawing. In this context, all of the described or represented features, alone or in any combination, form the subject matter of the present invention, regardless of their combination in the patent claims or their antecedent reference, and regardless of their wording and representation in the specification and in the figures, respectively.

BRIEF DESCRIPTION OF THE DRAWINGS

Exemplary embodiments of the present invention are explained below with reference to the figures.

DETAILED DESCRIPTION OF EXAMPLE EMBODIMENTS

Figure 1:
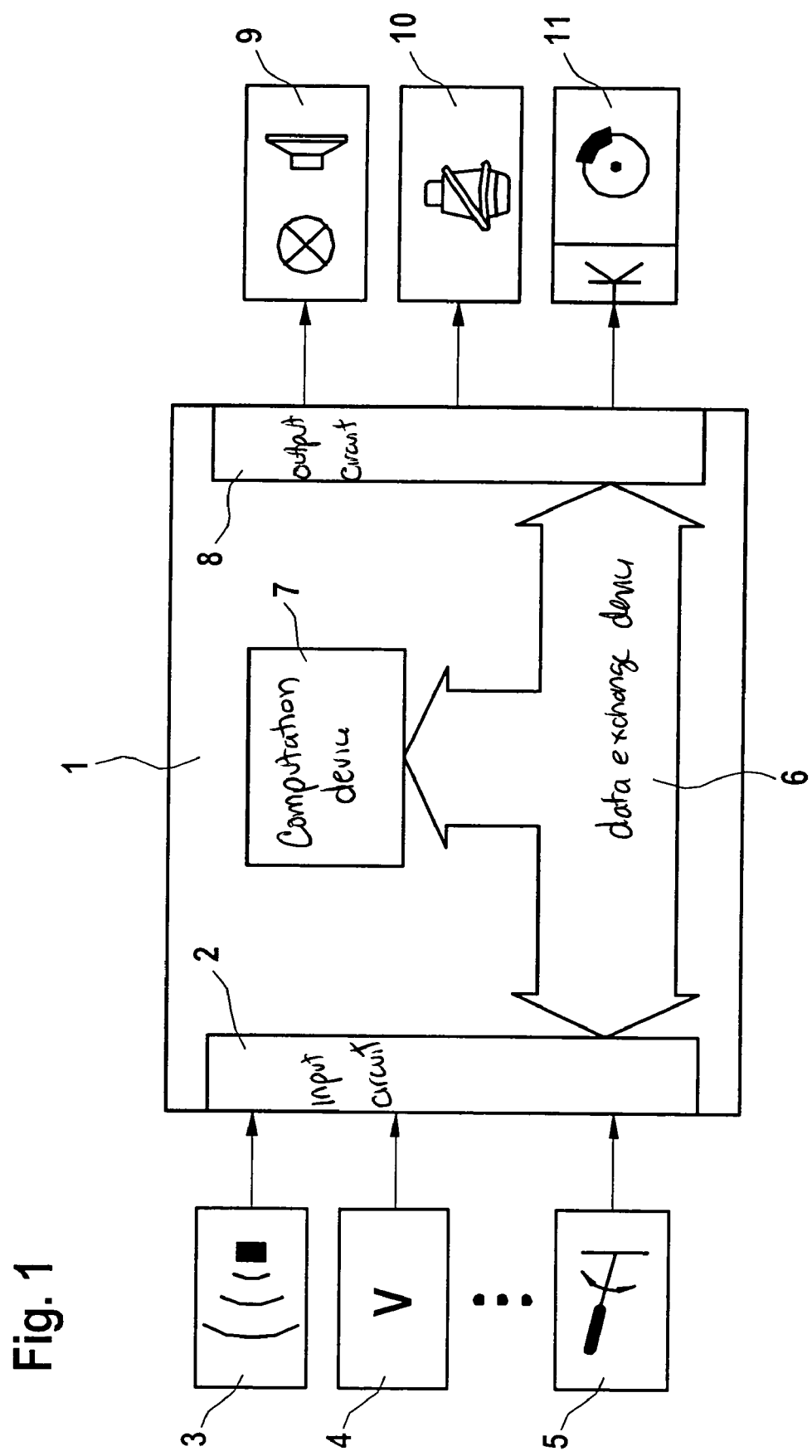
FIG. 1 shows a schematic block diagram of specific embodiment of the device according to the present invention.

FIG. 1 shows an evaluation device 1, which, among other things, has an input circuit 2. Input signals can be supplied to evaluation device 1 via input circuit 2. As input signals, evaluation device 1 is supplied with, among other things, signals from an object detector 3, which may take the form for example of a radar sensor, a laser sensor, an ultrasonic sensor, a video sensor or of a combination of these sensor types. Object detector 3 ascertains for example the azimuth angle of preceding vehicles with respect to the extended vehicle longitudinal axis of host vehicle 12 and is thereby able to determine which detected object is the preceding vehicle 13. Furthermore, object detector 3 ascertains the distance d between host vehicle 12 and preceding vehicle 13 and the relative velocity $V_{rel}$ of preceding vehicle 13 with respect to host vehicle 12 and supplies these measured variables to input circuit 2. In an advantageous manner, object detector 3 is mounted to the front side of the vehicle or in the area of the windshield and covers the space ahead of host vehicle 12 and is able to detect the objects located in the detection range. Furthermore, a velocity sensor 4 is provided, which determines the velocity V of host vehicle 12 and supplies it to input circuit 2. Velocity sensor 4 may be a specially provided velocity sensor, which measures, for example, the wheel speed, or a velocity sensor may be used, which is provided for example in connection with an anti-lock device or a driving dynamics control of vehicle 12. With the knowledge of the host vehicle's velocity V it is possible to convert the relative velocities $V_{rel}$ ascertained by object detector 3 into absolute velocities. Furthermore, additional input signal devices may be provided, for example control element 5, by which the driver is able to activate and deactivate the device according to the present invention or change settings of the device so as to adapt them to his requirements. The input signals supplied to input circuit 2 are supplied via a data exchange device 6 to a computation device 7, which may take the form of a microprocessor or signal processor for example. From the input data supplied to computation device 7, the latter computes, in accordance with the method of the present invention, output variables which are implemented by actuators downstream. The method according to the present invention may be contained in computation device 7 in the form of a control program. On the basis of velocity V1 of preceding vehicle 13 as well as a fictitiously assumed deceleration a1, which in magnitude corresponds approximately to an average vehicle deceleration, and by taking into account the distance d between the two vehicles and the velocity V0 of vehicle 12, and by taking into account a reaction time tR of the driver, computation device 7 ascertains whether a collision would be unavoidable if vehicle 13 would indeed implement deceleration a1 and if, following the elapse of reaction time tR, a deceleration of host vehicle 12, which approximately corresponds to the maximum possible deceleration a2 of vehicle 12, were implemented, or whether it is not to be expected that host vehicle 12 will run into preceding vehicle 13 from behind. As a function of the result of the computation, computation device 7 emits a warning signal, which is supplied to output circuit 8 via data exchange device 6. Output circuit 8 transmits the warning signal to downstream warning devices 9, 10, 11, which convert this warning signal into a driver warning. As a warning device, an acoustic and/or visual warning device may be provided for example. The visual warning device is, for example, a control lamp in the dashboard of the vehicle or a plain text display in a dashboard display which informs the driver about the reason for the warning. Furthermore it is also possible to project the visual warning device in the form of a head-up display into the driver's field of vision. The acoustic warning device may be a signal sound, for example, which is output by a loudspeaker, or a voice output, which informs the driver about the reason for the warning using a voice output. Alternatively or additionally, it is possible to use a reversible belt tensioner 10 as a warning device which informs only the driver or all occupants of the vehicle about the potential collision situation by a single or repeated pretensioning of the safety belt. It is likewise possible, alternatively to the described warning devices 9, 10 or in combination or as an alternative to trigger deceleration device 11 of the vehicle briefly. A brief triggering of the vehicle's deceleration devices 11 warns the driver of the vehicle about the imminent possibility of collision by briefly decelerating vehicle 12. In this respect, it is additionally possible to ascertain the coefficient of friction of the host vehicle during the brief deceleration of vehicle 12 and to use this ascertained coefficient of friction to adjust precisely an emergency braking action that may possibly be necessary later.

Figure 2:
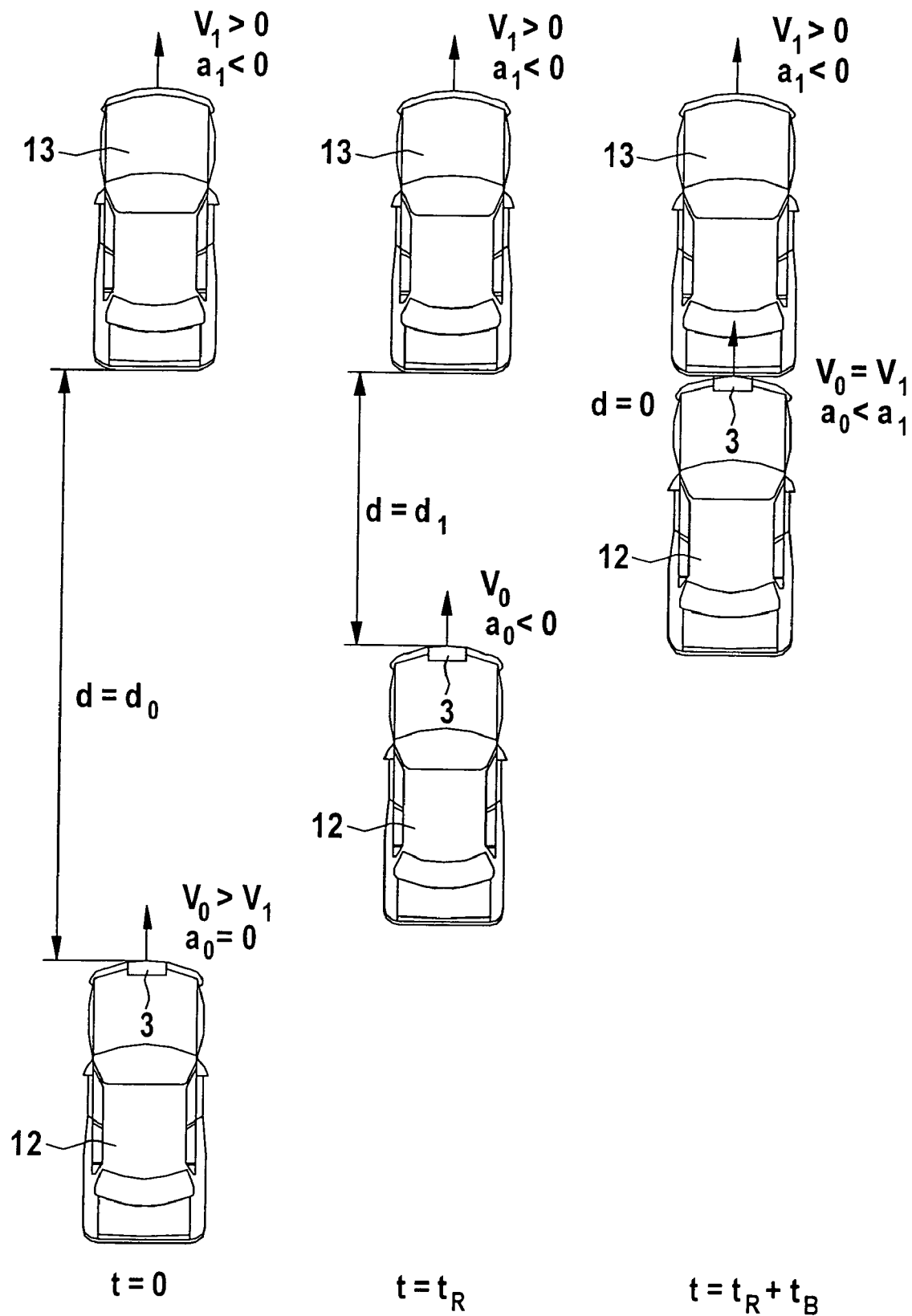
FIG. 2 shows the mode of operation of a specific embodiment of the method according to the present invention.

FIG. 2 shows the operation of the method according to the present invention. On the left side, host vehicle 12 is shown at time t=0, which has an object detector 3, and a preceding vehicle 13 is shown, which is traveling ahead of host vehicle 12 at a distance of d=d0. In this case, vehicle 13 moves forward at velocity V1 and host vehicle 12 follows the preceding vehicle at velocity V0, which for activating a warning is necessarily greater than velocity V1 of preceding vehicle 13. Although preceding vehicle 13 is not decelerated, evaluation device 1 assumes for calculating the risk of collision that preceding vehicle 13 is decelerated at the fictitious deceleration a1<0. In a realistic case of a deceleration of preceding vehicle 13, reaction time tR would elapse before the driver of host vehicle 12 would be able to implement a reaction. This is illustrated by the central partial figure, which represents the precalculated scenario at time t=tR. Preceding vehicle 13 would continue to move at velocity V1, which would be lower, however, as a result of deceleration a1, than at time t=0. Since during the time period between times t=0 and t=tR the driver of vehicle 12 due to the reaction time has not yet performed a vehicle intervention, host vehicle 12 continues to move at velocity V0 as at time t=0. This reduces the distance between the two vehicles from d=d0 to d=d1 during the time period between times t=0 and t=tR, as shown. Starting at time t=tR, vehicle 12 also begins a deceleration a0, deceleration a0 being quantitatively higher than deceleration a1 of preceding vehicle 13. Since the preceding vehicle is decelerated at an average deceleration a1, but host vehicle 12 starting at time t=tR decelerates at a deceleration corresponding approximately to the maximum possible vehicle deceleration, it may be assumed that a0<a1 since a0 is quantitatively greater than the magnitude of a1. Furthermore, evaluation device 1 continues to compute, on the assumptions described, how the further braking maneuver will end. For this purpose, the right partial diagram of FIG. 2 shows time t=tR+tB, that is, the time following the elapse of reaction time tR and following the elapse of braking time tB. For this purpose one assumes that preceding vehicle 13 continues to brake at the constant fictitious deceleration a1 and that as a result vehicle 13 at time t=tR+tB has a velocity V1 that is lower than the velocities V1 at times t=0 or t=tR. During the braking time period tB, host vehicle 12 continued to be decelerated, the right partial figure showing the limiting case of a collision. In this connection, the limiting case is to be understood in such a way that when reaching a distance d=0, host vehicle 12 has been decelerated to a travel velocity V0 which is equal to velocity V1 of preceding vehicle 13. In this case, vehicle 12 would touch vehicle 13, without, however, allowing an application of force to occur. If one now calculates that at time t=tR+tB, at which velocity V0 of host vehicle 12 is equal to velocity V1 of preceding vehicle 13 and there is a distance d>0, then one can already predict at time t=0 that a collision is avoidable and no driver warning is issued. If one calculates in advance that at time t=tR+tB at which host vehicle 12 has velocity V0, which is equal to velocity V1 of preceding vehicle 13, and that there is a distance d=0 or d<0, then one can predict already at time t=0 that a collision cannot be avoided by a strong deceleration intervention in vehicle 12 and the driver of vehicle 12 must be warned about this in accordance with the present invention. This occurs by issuing a driver warning to warning devices 9, 10, 11. Thus, at every computation point it is assumed that preceding vehicle 13 could initiate a deceleration a1 and a braking scenario is precalculated for this purpose in which the driver's reaction time tR, the magnitude of the deceleration a2 of host vehicle 12, the distance d between the vehicles, the relative velocity $V_{rel}$ of the preceding vehicle 13 with respect to host vehicle 12 and the host vehicle's velocity V0 are ascertained, and this is used to calculate whether a collision would be avoidable or whether it must occur. Accordingly, the driver is warned and advised to increase his distance d or to reduce his own vehicle velocity V0 so as to be able to brake in time in the event that preceding vehicle 13 triggers a deceleration.

What is claimed is:

1. A method for warning a driver of a motor vehicle, comprising:
   detecting, by an object detector, at least one preceding vehicle, and a distance and relative velocity with respect to the motor vehicle;
   supplying the distance and relative velocity to an evaluation device;
   ascertaining, by the evaluation device, whether, assuming that the preceding vehicle initiated a deceleration, a collision with the preceding vehicle would be avoidable as a function of a reaction time of the driver and a maximum possible deceleration of the motor vehicle; and
   activating a warning device in an event that the collision would be unavoidable.

2. The method as recited in claim 1, wherein the reaction time of the driver is determined by averaging reaction times from previous driving situations in which a driver reaction was required.

3. The method as recited in claim 1, wherein the reaction time of the driver is a predetermined value.

4. The method as recited in claim 3, wherein the driver of the vehicle specifies the reaction time using a control element.

5. The method as recited in claim 1, wherein the warning device issues at least one of an acoustic and visual signal.

6. The method as recited in claim 1, wherein the warning device issues a driver warning using a reversible belt tensioner, the reversible belt tensioner being pretensioned at least one time.

7. The method as recited in claim 1, wherein the warning device issues a driver warning device by a brief triggering of a deceleration device.

8. The method as recited in claim 1, wherein the warning device issues a driver warning at least one of: i) by a haptic accelerator pedal, and ii) in the form of a vibration of a steering wheel.

9. A device for warning a driver of a motor vehicle, comprising:
   an object detector which detects a preceding vehicle and a distance and relative velocity with respect to the motor vehicle;
   an evaluation device which receives the distance and the relative velocity, the evaluation device configured to ascertain whether, assuming that the preceding vehicle initiated a deceleration, a collision with the preceding vehicle would be avoidable as a function of a reaction time of the driver and of a maximum possible deceleration of the motor vehicle; and
   a driver warning device configured to issue a driver warning in an event that a collision is unavoidable.

10. The device as recited in claim 9, wherein the driver warning device is at least one of a visual and acoustic signaling device.

11. The device as recited in claim 9, wherein the driver warning device is a reversible belt tensioner.

12. The device as recited in claim 9, wherein a vehicle deceleration device is used as the driver warning device.

13. The device as recited in claim 9, wherein the reaction time of the driver is determined by averaging reaction times from previous driving situations in which a driver reaction was required.

14. The device as recited in claim 9, wherein the reaction time of the driver is a predetermined value.

15. The device as recited in claim 9, wherein the driver of the vehicle specifies the reaction time using a control element.

16. The device as recited in claim 9, wherein the warning device provides a driver warning using a reversible belt tensioner that is pretensioned at least one time.

17. The device as recited in claim 12, wherein the warning includes a brief triggering of the vehicle deceleration device.

18. The device as recited in claim 9, wherein the warning device issues a driver warning by at least one of through a haptic accelerator pedal and by vibrating a steering wheel.

19. The device as recited in claim 9, wherein the driver warning device is at least one of a visual signaling device, an acoustic signaling device, a reversible belt tensioner that is pretensioned at least one time, and a vehicle deceleration device, wherein the reaction time of the driver is one of (i) determined by averaging reaction times from previous driving situations in which a driver reaction was required, and (ii) a predetermined value.

20. The device as recited in claim 19, wherein the warning device issues a driver warning by at least one of through a haptic accelerator pedal and by vibrating a steering wheel.

21. The device as recited in claim 1, wherein the driver warning device is at least one of a visual signaling device, an acoustic signaling device, a reversible belt tensioner that is pretensioned at least one time, and a vehicle deceleration device, wherein the reaction time of the driver is one of (i) determined by averaging reaction times from previous driving situations in which a driver reaction was required, and (ii) a predetermined value.

22. The device as recited in claim 21, wherein the warning device issues a driver warning by at least one of through a haptic accelerator pedal and by vibrating a steering wheel.

* * * * *